Figure 3:
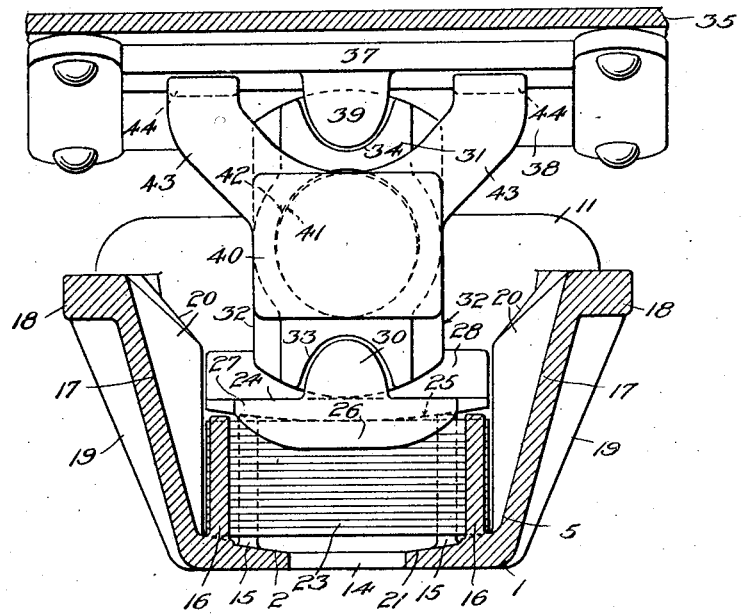

Oct. 15, 1929.  M. H. MARTIN  1,732,102
TRUCK BOLSTER AND SIDE BEARING
Original Filed May 18, 1926  2 Sheets-Sheet 1
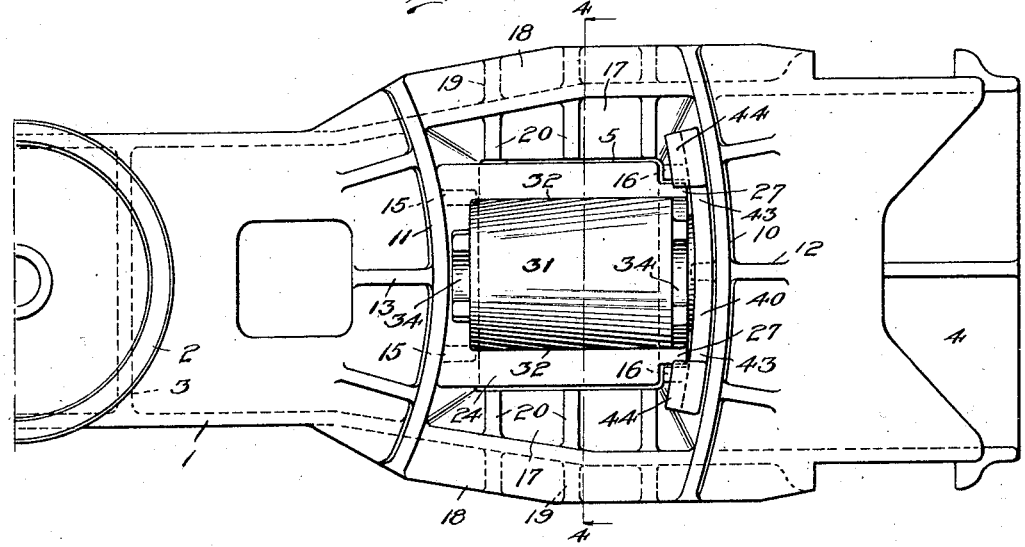
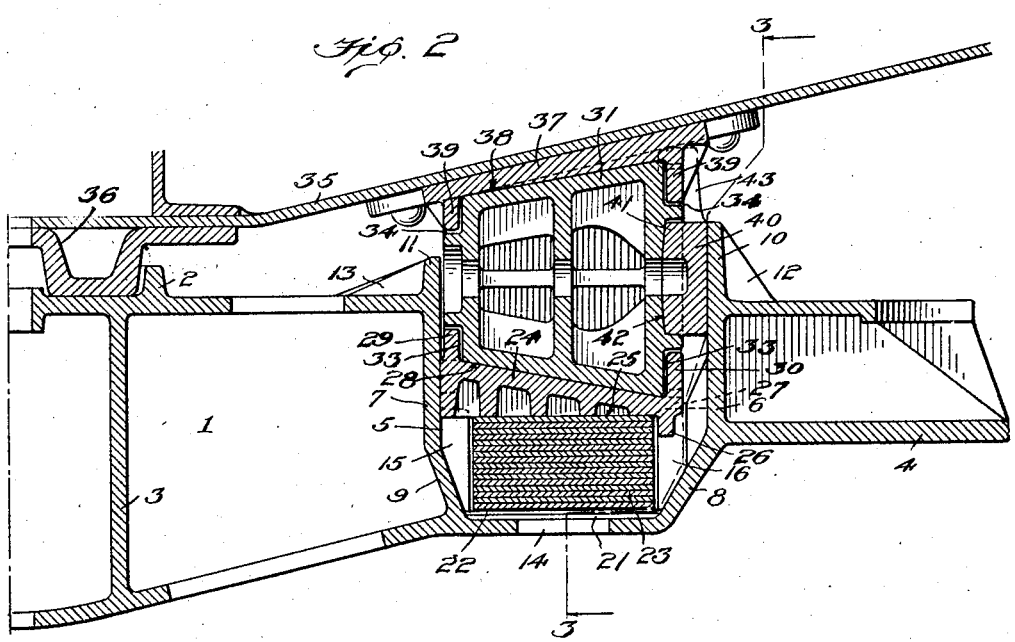
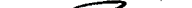

Oct. 15, 1929.  M. H. MARTIN  1,732,102
TRUCK BOLSTER AND SIDE BEARING
Original Filed May 18, 1926  2 Sheets-Sheet 2

Inventor
Mark H. Martin
By
Attorney

Patented Oct. 15, 1929

1,732,102

UNITED STATES PATENT OFFICE

MARK H. MARTIN, OF BALTIMORE, MARYLAND, ASSIGNOR, BY MESNE ASSIGNMENTS, TO T. H. SYMINGTON AND SON, INC., OF BALTIMORE, MARYLAND, A CORPORATION OF MARYLAND

TRUCK BOLSTER AND SIDE BEARING

Application filed May 18, 1926, Serial No. 109,968. Renewed July 21, 1928.

The invention relates to truck bolsters forming part of railroad car trucks.

The principal object of the invention, generally stated, is to provide a bolster equipped with a specially and peculiarly constructed and arranged side bearing structure which will act to steady or stabilize the body bolster with respect to the truck, thereby greatly reducing the tendency of the car to develop any side sway or roll as is bound to occur in travel as the result of various causes and conditions.

Another object of the invention is to provide a truck bolster and side bearing structure cooperating with depending bearing members or elements on the body bolster for yieldably supporting the latter, the side bearings sustaining at least a portion of the load instead of it all being concentrated at the center bearing, stresses and strains upon the bolster being consequently greatly reduced.

A more specific object of the invention is to provide a truck bolster having a transverse pocket therein within which is mounted a spring supported bearing member on which is disposed and upon which travels a roller engaged by a bearing element depending from the underside of the body bolster, the spring means permitting yielding of the side bearing structure upon relative rocking movement of the body and truck bolsters, the side bearing structure being, moreover, maintained in constant engagement with the bearing elements on the body bolster so as to prevent imparting any hammer-like blows to the bolster and other parts of the entire truck structure.

Another object of the invention is to provide a structure of this character in which the truck bolster may have such cross sectional configuration as to permit an unusually great degree of movement of the rollers during relative swivelling movement of the truck and body bolsters without the rollers coming into contact with the ends of the pockets or the sides of the bolster body or walls.

Still another object of the invention is the provision of a bolster and side bearing structure in which the pocket for the bottom bearing member and the springs for supporting the same is provided with guide webs located at the ends and sides thereof in position to maintain the springs and bottom bearing member against displacement in a horizontal plane, the movement being consequently limited to the vertical.

A still further object of the invention is the provision of a bolster and side bearing structure embodying a roller located between the truck and body bolsters and co-acting with bearing elements carried thereby, there being interfitting means on the roller and said bearing elements whereby the roller will have a limited rocking movement upon relative swivelling of the bolsters.

Another object of the invention is the provision of a bolster and side bearing construction in which is provided a specially constructed combined guide and wear plate device carried by the roller and slidably mounted with respect to the body bolster, the wear device taking the outward end thrust of the side bearing roller while acting to guide it properly in its movement.

A further object of the invention is the provision of a bolster and side bearing structure including a bearing element mounted upon a bank of leaf or plate springs mounted within a pocket and located between guides, the bearing element having a guide portion overlapping one side of the bank of springs, the bearing element further having other means coacting with guide and retaining webs for the springs to serve as stops for limiting the extent of compression of the springs.

Figure 4:
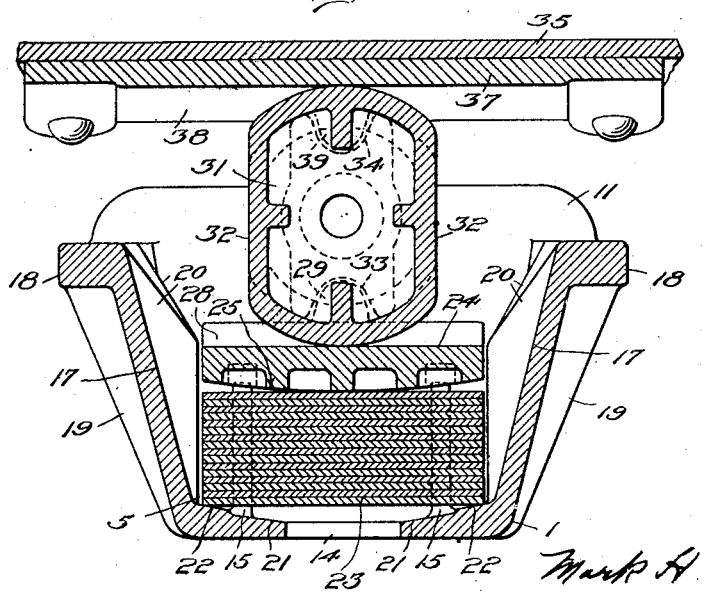

To the attainment of the foregoing and other objects and advantages, the invention preferably consists in the construction, combination and arrangement of parts to be hereinafter more fully described and claimed, and illustrated in the accompanying drawings in which:

Figure 1 is a plan view of a truck bolster constructed in accordance with the invention, Figure 2 is a substantially central vertical longitudinal section therethrough, Figure 3 is a vertical cross section taken on the line 3—3 of Figure 2, and Figure 4 is a vertical cross section taken on substantially the line 4—4 of Figure 1.

Referring more particularly to the drawings, the numeral 1 designates the truck bolster which is intended to be preferably of such design and dimensions as to replace one of any of the well known and generally accepted patterns or varieties. This bolster is represented as having a center bearing 2 at which point it is preferably reinforced by transverse webs 3, though this is a mere manufacturing detail easily capable of variation. The bolster has an extension 4 constructed and shaped to fit within the window opening of a truck side frame, not shown. At a point spaced inwardly from each end the bolster is formed with a pocket 5 which may be defined by vertical walls 6 and 7 spaced apart and extending transversely of the body of the bolster, the lower ends of these walls preferably converging as indicated at 8 and 9 and the upper ends projecting above the top of the bolster to define guides 10 and 11, respectively, which are arcuate in form and concentric with the vertical axis, these guides being preferably braced by webs 12 and 13 so as to have the necessary strength to withstand any end thrusts which may be applied thereto by the side bearing structure to be described. The bottom of the pocket may be formed with an opening 14 to permit the escape of rain water or other foreign matter which may enter the pocket. The bolster itself may embody other structural features in the matter of reinforcing webs and the like and it is conceivable that wide variations may be resorted to without affecting the main features involved.

For a reason which will be hereinafter made apparent there may be provided vertically extending guide webs 15 which extend into the pocket from the wall 7 and its inclined lower portion 9, and also vertically extending guide webs 16 extending into the pocket from the wall 6 and its inclined lower portion 8. While it may not be of vital importance, I prefer that the side walls 17 of the bolster diverge upwardly at the ends of the pocket 5, flanges 18 being provided at the upper edges, which flanges are preferably reinforced by webs 19. Projecting into the pocket from the opposite sides 17 are guide webs 20 which have vertical faces as have the webs 15 and 16. The bottom of the pocket is represented as having a concaved upper face 21 at the ends of which are ledges 22 constituting supporting means for a bank of plate or leaf springs 23 which fit loosely within the confines of all the guide webs 15, 16 and 20, these webs consequently acting to prevent horizontal displacement of the leaves or plates of the bank in any direction while permitting flexing under compression.

Mounted upon the bank of springs is a bearing member 24 having a convex lower surface 25 provided for the purpose of uniformly distributing the strain upon the bank of springs when compressive force is applied thereto as will occur during car travel. At one edge the bearing member 24 is represented as having a depending flange 26 which projects downwardly beyond the outer edge of the bank of springs, as indicated in Figures 2 and 3, and at its outer corners the bearing member may have lugs 27 thereon fitting against and inwardly of the outermost ones of the webs 16 for the purpose of preventing movement of the bearing member in any direction other than vertically. The upper surface 28 of the bearing member is inclined downwardly from the center or vertical axis of the bolster and the ends are preferably formed with upstanding projections or teeth 29 and 30 for a purpose to be described.

Mounted upon the bearing member 24 is a roller 31 here shown as of frusto-conical or tapered shape. This roller may be made hollow for the sake of lightness and may have any desired interior construction in so far as webs, braces and the like are concerned. The pitch of the inclined surface 28 above described is of course such that the roller will bear flatly thereon. At opposite sides the roller is shown as flattened at 32 so that it may have ample movement with respect to the bolster without striking against the sides thereof. At its opposite ends the roller is preferably formed with recesses 33 and 34, the former of which receive the projections or teeth 29 and 30.

The numeral 35 designates the body bolster which is provided with the usual center plate 36 seating within the center bearing 2 on the truck bolster. On the underside of the body bolster is a bearing member 37 having an inclined surface 38 bearing upon the roller 31. This bearing member is also represented as provided at its underside with projections or teeth 39 received within the recesses 34 in the roller so that when relative swivelling movement of the body and truck bolsters occurs the roller may be said to rock upon the teeth 29 and 30, the engagement of all the teeth within the recesses insuring proper relation of the parts at all times so that after swivelling movement and return of the bolsters to their proper relative positions the roller will also be returned to its normal or intermediate position.

For taking up or sustaining the outward end thrust upon the roller, I preferably provide a wear plate 40 located within the pocket 5 and engaging against the inner face of the outer guide flange 10, this wear plate having a boss 41 thereon fitting within a recess 42 at the outer end of the roller. The wear plate may further include upwardly extending arms 43 terminating in laterally extending lugs 44 engaging slidably beneath the bearing member 37 at opposite sides of the tooth or projection 39 at the outer end thereof.

In service, it will be seen that the load, or at least the major portion thereof, is sustained by the center bearing in the usual manner. However, the bank of springs 23 is intended to be under a certain degree of compression even under light load conditions and as a consequence the rollers 31 of the side bearings will remain always in engagement with the bearing members 37 carried by the body bolster, there being consequently no play. When there is any relative rocking movement of the truck and body bolsters the springs 23 at the low side will be compressed, movement being thus yieldably checked. At the high side, the bearing member 24 is moved upwardly so that the roller 31 will be moved upwardly against the bearing member 37, the result being that when the reverse rocking movement occurs yieldable resistance will be offered thereto while at the same time the delivery of a hammer-like blow upon the side bearing will be prevented. Obviously the elimination of impact will relieve not only the side bearings but also all the truck parts of severe strains and stresses and the length of life of the parts will therefore be greatly increased. As the bottom 21 of the pocket is concave and as the bottom surface 25 of the bearing member 24 is convex, the bank of springs 23 may yield downwardly freely, the pressure being uniformly distributed owing to the convexity of the bearing member 24. When the springs are flexed to such an extent that the curvature thereof conforms to that of the lower surface 25 of the bearing member 24, flexing will cease. This feature makes it unnecessary to provide any stops for limiting the downward movement of the bearing member 24. Movement or displacement of the springs in any direction other than vertical is prevented by the guide webs 15, 16 and 20, no auxiliary guides being necessary.

When swivelling movement of the truck or body bolsters occurs it is clear that the rollers 31 at the ends will rock upon the bearing members 24, the movement being guided by the engagement of the various teeth or projections on the bearing members within the corresponding recesses in the end portions of the rollers, the end thrust being taken by the wear plate 40 so that the roller itself will not become worn at the end. Clearly, the wear plate is easily replaceable when necessary and it is equally clear that wear on the contacting surfaces of the bearing members 24 and 37 and the roller will be automatically taken up by the bank of springs though it is apparent that shims may be placed beneath the springs or at any other desired points for accomplishing the same purpose in case it is not desired to rely upon the the spring action alone.

From the foregoing description and a study of the drawings it will be apparent that I have thus provided a simply constructed bolster and side bearing structure which may be used to replace the ordinary variety while possessing the great advantage of opposing yieldable resistance to rocking movement of the car so that car roll or side sway will be reduced to the minimum. In fact, all the benefits and objects of the invention are attained.

While I have shown and described the preferred embodiment of the invention, it should be understood that the disclosure is merely illustrative as I reserve the right to make all such changes in the form, construction and arrangement of parts as will widen the field of utility and increase the adaptability of the invention provided such changes constitute no departure from the spirit of the invention or the scope of the claims hereunto appended.

Having thus described the invention, I claim:

1. A truck bolster having a center bearing and provided inwardly of each end with a pocket, inwardly extending webs formed on all sides of the pocket, a bank of plate springs in the pocket within the confines of said webs, a bearing member having a convex surface seating upon said springs and having an inclined upper surface, a tapered roller within the pocket resting upon said inclined surface, in combination with a body bolster having a center plate engaging within said center bearing, and a bearing member engaging upon said roller.

2. A truck bolster having a center bearing and provided near each end with a pocket, the pocket being of arcuate shape and concentric with the vertical axis of the bolster, the sides of the pocket flaring upwardly and outwardly, webs projecting inwardly from the curved walls of the pocket, other webs projecting inwardly from the flaring sides of the pocket, all of said webs defining a rectangular space, a bank of plate springs located within said space and restrained by said webs against horizontal displacement, a bearing member located within the confines of said webs and seated upon the springs, and a roller resting upon said bearing member and adapted to cooperate with a depending bearing element on a body bolster.

3. A truck bolster having a center bearing and provided near each end with a pocket, the pocket being of arcuate shape and concentric with the vertical axis of the bolster, the sides of the pocket flaring upwardly and outwardly, webs projecting inwardly from the curved walls of the pocket, other webs projecting inwardly from the flaring sides of the pocket, all of said webs defining a rectangular space, a bank of plate springs located within said space and restrained by said webs against horizontal displacement, a bearing member located within the confines of said webs and seated upon the springs, and a roller resting upon said bearing member and adapted to cooperate with a depending bearing element on a body bolster, the bottom of the pocket being concave and having ledges at the opposite sides constituting seats for the bank of springs.

4. A truck bolster having a center bearing and provided near each end with a pocket, the pocket being of arcuate shape and concentric with the vertical axis of the bolster, the sides of the pocket flaring upwardly and outwardly, webs projecting inwardly from the curved walls of the pocket, other webs projecting inwardly from the flaring sides of the pocket, all of said webs defining a rectangular space, a bank of plate springs located within said space and restrained by said webs against horizontal displacement, a bearing member located within the confines of said webs and seated upon the springs, and a roller resting upon said bearing member and adapted to cooperate with a depending bearing element on a body bolster, the curved walls of the pocket extending upwardly beyond the top of the bolster and constituting guides for the roller during movement thereof.

5. A truck bolster having a center bearing and provided near each end with a pocket, the pocket being of arcuate shape and concentric with the vertical axis of the bolster, the sides of the pocket flaring upwardly and outwardly, webs projecting inwardly from the curved walls of the pocket, other webs projecting inwardly from the flaring sides of the pocket, all of said webs defining a rectangular space, a bank of plate springs located within said space and restrained by said webs against horizontal displacement, a bearing member located within the confines of said webs and seated upon the springs, and a roller resting upon said bearing member and adapted to cooperate with a depending bearing element on a body bolster, said bearing member having a depending flange portion overlying the outer edge of the bank of springs.

6. A truck bolster having a center bearing and provided near each end with a pocket, the pocket being of arcuate shape and concentric with the vertcal axis of the bolster, the sides of the pocket flaring upwardly and outwardly, webs projecting inwardly from the curved walls of the pocket, other webs projecting inwardly from the flaring sides of the pocket, all of said webs defining a rectangular space, a bank of plate springs located within said space and restrained by said webs against horizontal displacement, a bearing member located within the confines of said webs and seated upon the springs, and a roller resting upon said bearing member and adapted to cooperate with a depending bearing element on a body bolster, said bearing member having its outer corners cut away to define lugs located inwardly of the webs on the adjacent curved wall of the pocket.

7. A truck bolster having a center bearing and provided near each end with a pocket, the pocket being of arcuate shape and concentric with the vertical axis of the bolster, the sides of the pocket flaring upwardly and outwardly, webs projecting inwardly from the curved walls of the pocket, other webs projecting inwardly from the flaring sides of the pocket, all of said webs defining a rectangular space, a bank of plate springs located within said space and restrained by said webs against horizontal displacement, a bearing member located within the confines of said webs and seated upon the springs, and a roller resting upon said bearing member and adapted to cooperate with a depending bearing element on a body bolster, said bearing member having a depending flange portion extending transversely of the pocket inwardly of the webs on the outer curved wall thereof, said depending flange portion extending over the outer portion of the bank of springs.

8. A truck bolster provided near each end with a pocket defined between spaced outer and inner walls extending transversely of the bolster, the walls projecting above the top of the bolster and being arcuate in shape and concentric with the vertical axis of the bolster, a resiliently supported bearing member located within the pocket and having an inclined upper surface, a tapered roller mounted upon said surface and rockable with respect thereto, said roller being adapted to cooperate with and to be engaged by a depending bearing element on a body bolster, and a thrust bearing member located between the outer end of the roller and the outer one of said curved walls, said thrust bearing member having portions adapted to be engaged by the depending bearing element on the body bolster.

9. A truck bolster provided near each end with a pocket defined between spaced outer and inner walls extending transversely of the bolster, the walls projecting above the top of the bolster and being arcuate in shape and concentric with the vertical axis of the bolster, a resiliently supported bearing member located within the pocket and having an inclined upper surface, a tapered roller mounted upon said surface and rockable with respect thereto, said roller being adapted to cooperate with and to be engaged by a depending bearing element on a body bolster, and a thrust bearing member located between the outer end of the roller and the outer one of said curved walls, said thrust bearing member having a boss received within a recess in the outer end of the roller and further having upwardly diverging arm portions adapted to engage beneath the underside of a bearing member depending from a body bolster.

10. In combination, a truck bolster having a center bearing and formed with a pocket spaced inwardly from each end, a body bolster having a center plate supported within said center bearing, a depending bearing member on the body bolster above each pocket and having depending projections thereon, a resiliently supported bearing member within the pocket having an inclined surface and upstanding projections, a tapered roller located between said bearing members and having its ends recessed for the accommodation of said projections, the walls of the pocket being prolonged upwardly to define guides extending to a point above the normal axis of the roller, and a thrust bearing member formed as a plate located against the inner face of the upwardly prolonged portion of the outer pocket wall and having a boss, the outer end of the roller being recessed to receive the boss, and upwardly divergent arms on the thrust bearing member terminating in lateral lugs bearing against the underside of the bearing member on the body bolster.

11. A truck bolster having a center bearing and provided inwardly at each end with a pocket, guide means within the pocket, a bank of plate springs within the pocket within the confines of said guide means, a bearing member engaged upon said springs and adapted to flex the same upon the application of downward pressure, a roller on said bearing member, in combination with a body bolster swivelly connected with the truck bolster and having a depending bearing element engaging the roller.

12. In combination, truck and body bolsters swivelly connected, pockets near the ends of the truck bolster, a bank of plate springs within each pocket, side bearing means engaged within each pocket upon the springs and adapted to flex the latter upon downward pressure, depending bearing elements on the body bolster coacting with said side bearing means and a plurality of ribs formed on the walls of the pocket and having their inner edges vertically disposed.

13. A truck bolster having a pocket near each end, a bank of plate springs within the pocket, guide means forming part of the pocket for restraining the springs against horizontal displacement, bearing means within the pocket adapted to cooperate with depending bearing elements on a body bolster, and means on said bearing member overlying a portion of the side of the bank of springs.

14. In combination, truck and body bolsters, means swivelly connecting the same, the truck bolster having inverted frusto-pyramidal shaped pockets near its ends, the side and end walls of each pocket having integral guide ribs thereon with vertical opposed faces, a side bearing structure mounted within each pocket for cooperation with a depending bearing element on the body bolster, and normally inactive spring means within the confines of the guide ribs in each pocket beneath the side bearing means therein adapted to operate to produce frictional and spring resistance to rocking movement of the body bolster with respect to the truck bolster.

15. In combination, truck and body bolsters, means swivelly connecting the same, the truck bolster being formed near each end with a pocket defined by downwardly converging inclined side walls and vertical transverse walls having their lower portions inclined and converging downward, guide ribs formed on the walls of the lower portion of each pocket, the bottom of each pocket being concaved and being formed with ledges at the juncture of the side walls with the bottom, a bank of plate springs within the confines of the guide ribs in each pocket with the ends of the lowermost plate in the bank resting upon said ledges, a bearing member having a convex lower surface engaging upon the top of the bank of springs and located within the confines of said ribs, and side bearing means engaged upon said bearing member and interposed between the same and the body bolster.

In testimony whereof I affix my signature.

MARK H. MARTIN.